United States Patent [19]

Shima

[11] 4,380,052
[45] Apr. 12, 1983

[54] SINGLE TRANSMISSION BUS DATA NETWORK EMPLOYING A DAISY-CHAINED BUS DATA ASSIGNMENT CONTROL LINE WHICH CAN BYPASS NON-OPERATING STATIONS

[75] Inventor: George T. Shima, Kamakura, Japan

[73] Assignee: Burroughs Corporation, Detroit, Mich.

[21] Appl. No.: 187,531

[22] Filed: Sep. 15, 1980

[51] Int. Cl.³ .............................................. H04Q 9/00
[52] U.S. Cl. ................................ 364/900; 340/825.5; 370/85
[58] Field of Search ... 364/200 MS File, 900 MS File; 370/85, 86, 88; 340/825.5, 825.51

[56] References Cited

U.S. PATENT DOCUMENTS

| | | | |
|---|---|---|---|
| 3,629,854 | 12/1971 | Hauck et al. | 364/200 |
| 3,742,148 | 6/1973 | Ledeen et al. | 370/85 |
| 4,292,623 | 9/1981 | Eswaran et al. | 340/825.5 |

Primary Examiner—Raulfe B. Zache
Attorney, Agent, or Firm—Mervyn L. Young; J. Ronald Richbourg; Kevin R. Peterson

[57] ABSTRACT

This disclosure relates to a network of stations having a single transmission bus. A bus assignment control line is daisy-chained to all of the stations to form a closed loop such that an assignment signal will circulate through the loop and return to the originating station after each station has been given an equal chance to be serviced. Each station is provided with means to detect when the preceding station is malfunctioning or is not turned on, and in response thereto, to transmit a bus assignment control signal to the next succeeding station if it itself does not require access to the transmission bus.

9 Claims, 10 Drawing Figures

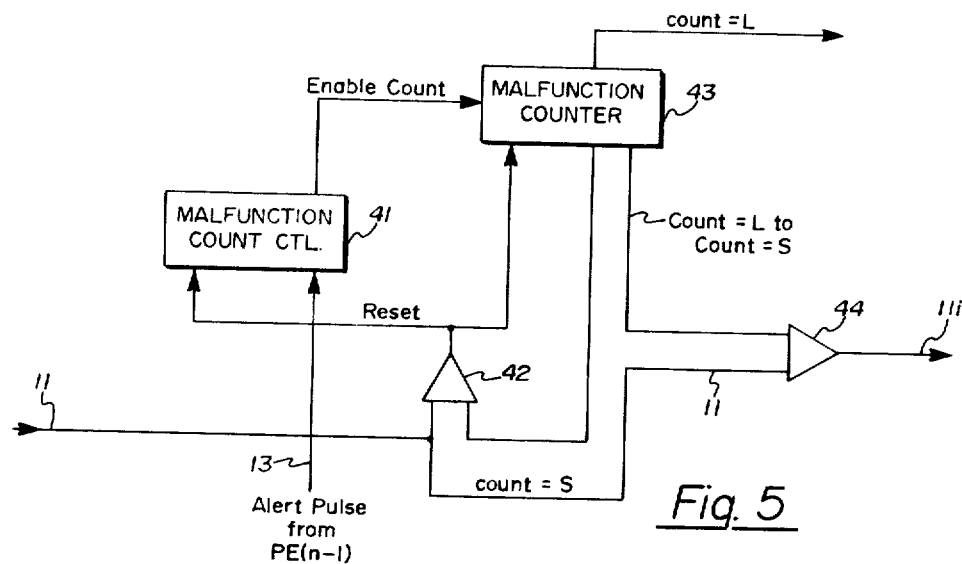
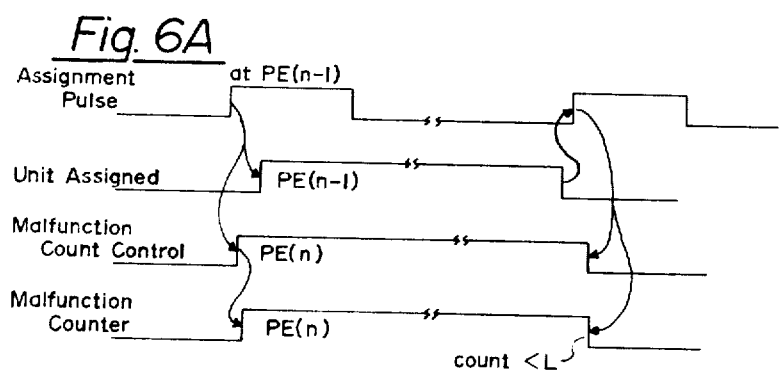
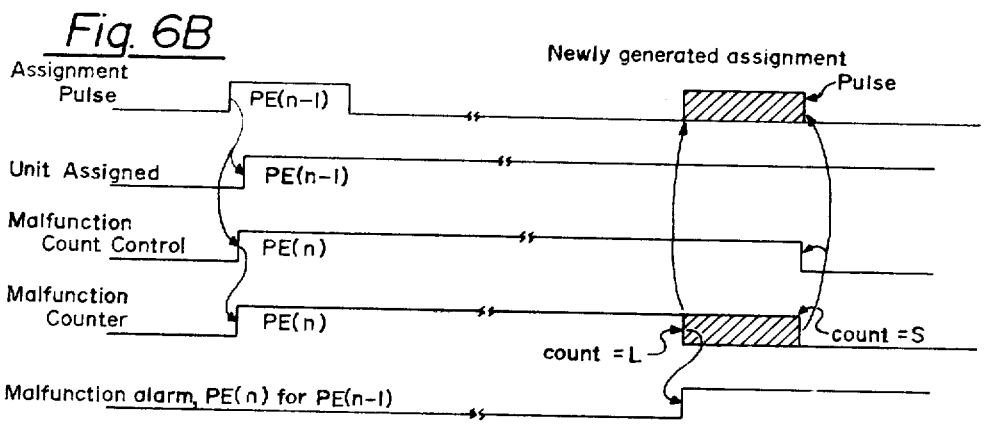

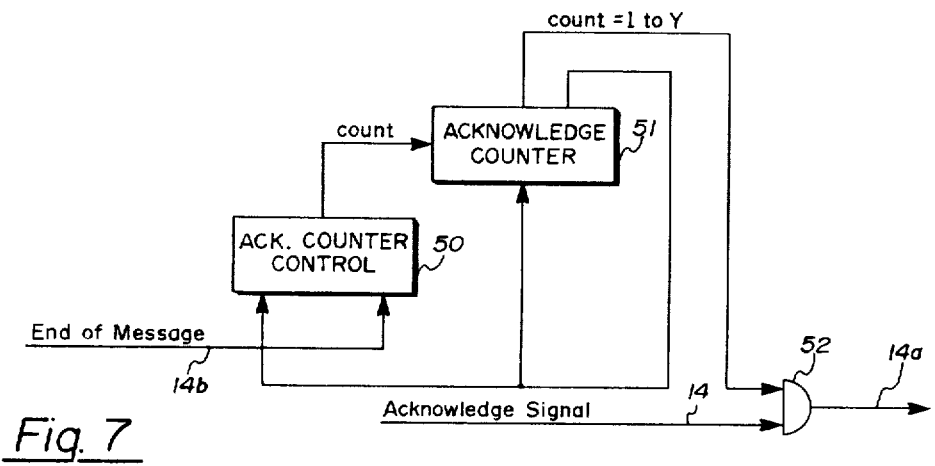
Fig. 7
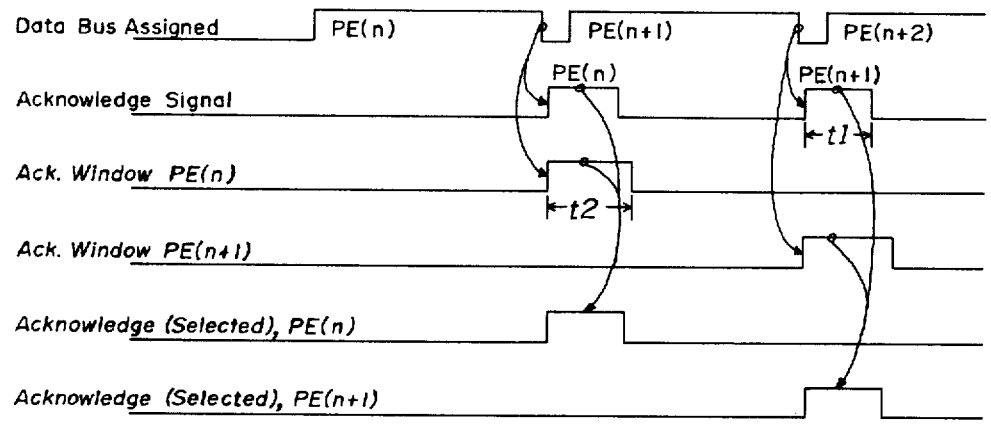
Fig. 8          t1<t2

SINGLE TRANSMISSION BUS DATA NETWORK EMPLOYING A DAISY-CHAINED BUS DATA ASSIGNMENT CONTROL LINE WHICH CAN BYPASS NON-OPERATING STATIONS

RELATED U.S. PATENT APPLICATIONS

U.S. Patent applications directly or indirectly related to the subject application are the following:

Ser. No. 187,532, filed Sept. 15, 1980 by George Shima and entitled "Single Transmission Bus Network Employing and Expandable Daisy-Chained Bus Assignment Control Line", and U.S. Pat. No. 4,342,995, issued Aug. 3, 1982 by George Shima and entitled "Data Network Employing a Single Transmission Bus for Overlapping Data Transmission and Acknowledgment Signals".

BACKGROUND OF THE INVENTION

1. Field of the Invention

This invention relates to a network of data stations which may be processors, memories and the like, and more particularly to such a network wherein control of the transmission between the stations is embedded in the network.

2. Description of the Prior Art

Prior art networks usually have been controlled by a master controller or computer which receives transmission requests from the respective terminals and grants access to a transmission channel by the individual station when the channel is available and according to some priority arrangement. Such master computers add to the cost of the network and are not required for those networks where the stations need communicate only between themselves or with a common storage file. Thus, it is desirable to have a data network where the transmission control is embedded in or shared by the stations making up that network.

A particular type of network of the prior art is one having a plurality of devices and a time-shared bus over which the devices send messages, the transfer of which is synchronized by a fixed frequency clock signal which is generated by a controller on the line. The controller also determines the priority by which the devices send messages over the bus. To that end, the controller receives a "request" signal from each device over separate control lines and sends a "request granted" signal back to each device over separate control lines. These control lines are not time-shared by the devices.

Also, the controller monitors all messages on the bus to determine if a parity error occurs. If an error does occur, then the controller sends a signal on another separate control line to the device which received the erroneous message.

An undesirable aspect of this type of network is that if a device receives a message which requires a response message to be sent, that response message cannot be sent immediately. Instead, the receiving device must first obtain access to the bus from the bus controller. Typically, several other devices will transmit messages on the bus before the receiving device is permitted to send its response. Thus, a communication between devices on the bus occurs in a random, illogical order.

Another undesirable aspect of the system is that too many separate control lines are required for the operating bus. This drawback is most severe for large systems, because the number of control lines increases as the number of devices increases.

Furthermore, the system is totally dependent on the bus controller for its operation. That is to say, the system simply cannot function when the controller is not operating. This is true even though the devices may be completely operational.

Another data processing network of the prior art includes a time-shared bus in which all message transfers occur between one of the devices and the bus controller. In operation, the bus controller sends spaceda-part polling pulses down a separate control line. A path for these pulses to pass serially through each device is established by the placement of jumper wires. Any device may transmit a message to the controller only after it receives a polling pulse on the line, blocks that pulse from traveling further down the line, and sends a signal to another control line which tells the controller to stop generating pulses until the message is sent. Each device generates its own asynchronous clocking signals on the respective lines to transfer messages on the bus. A device which has no message to send simply allows the pulses on the line to pass to the next device.

Once a device obtains the use of the bus, messages can be sent from that device to the bus controller and the controller can respond by immediately sending another message back to that same device. But the controller, or channel, cannot respond by sending a message back to a second device. Also, one device cannot send a message directly to another device.

The latter network does not utilize as many control lines as does the former network described above. But even so, the latter network still requires some separate control lines and still depends on a separate bus controller for its operation. Furthermore, the above reduction in control lines is obtained only at the cost of making the priority by which a device may obtain the bus very inflexible. That priority is limited by device positions on the bus.

It is, then, an object of the present invention to provide a network of stations employing a single transmission bus, which network does not require a separate bus controller.

It is another object of the present invention to provide a network of stations employing a single transmission bus wherein the bus assignment control line is a single daisy-chained circuit which nevertheless can be expanded to accommodate additional stations.

It is still another object of the present invention to provide a network of stations having a single daisy-chained bus assignment control line which can detect and bypass non-operating stations in the network.

It is still a further object of the present invention to provide a network employing a single data transmission bus which can accommodate overlapping data transmission and acknowledgment signals in a common mode configuration.

SUMMARY OF THE INVENTION

In order to achieve the above-identified objects, the present invention is directed toward a network of stations, such as processing elements, coupled to a single transmission bus. A transmission bus assignment control line is daisy-chained to all the processing elements. Since this line is a closed loop, the assignment signal will return to the originating station after a finite period of time and all processing elements will be given an equal chance to be serviced by the bus. Each processing element is provided with means to detect when the preceding processing element is malfunctioning or is not turned on and, in response thereto, to transmit an assignment control signal to the next succeeding processing element if it itself does not require access. To this end, each processing element is alerted when the assignment control signal arrives at the previous processing element. If the alerted processing element does not receive the assignment control signal from that previous processing element after a predetermined time, sufficient to allow the previous element to transmit a message, it will transmit its own assignment control signal to the next succeeding processing element if it itself does not require access.

DESCRIPTION OF THE DRAWINGS

The above and other objects, advantages and features of the present invention will become more readily apparent from a review of the following disclosure when taken in conjunction with the drawings wherein:

FIG. 5 is a schematic diagram illustrating the malfunction detection circuitry as employed in the present invention;

FIGS. 6A and 6B are sets of timing diagrams illustrating the malfunction detection of the present invention;

FIG. 7 is a schematic diagram illustrating the acknowledgment circuitry as employed in the present invention; and FIG. 8 is a timing diagram illustrating the arrival of an acknowledgment signal as employed in the present invention.

GENERAL DESCRIPTION OF THE INVENTION

It is a common practice to use a single transmission bus arrangement to transmit data from one processing element to another. Processing elements as used here could be any number of components, such as microcomputers, printers, storage devices and so forth. Each processing element input/output circuit would be commonly tied to a bus. This bus will be assigned to a processing element for transmission of data from that processing element to another processing element on the same bus. Generally speaking, assignments are controlled by one processing element if more than one line is used for determining the assignment.

Figure 1:
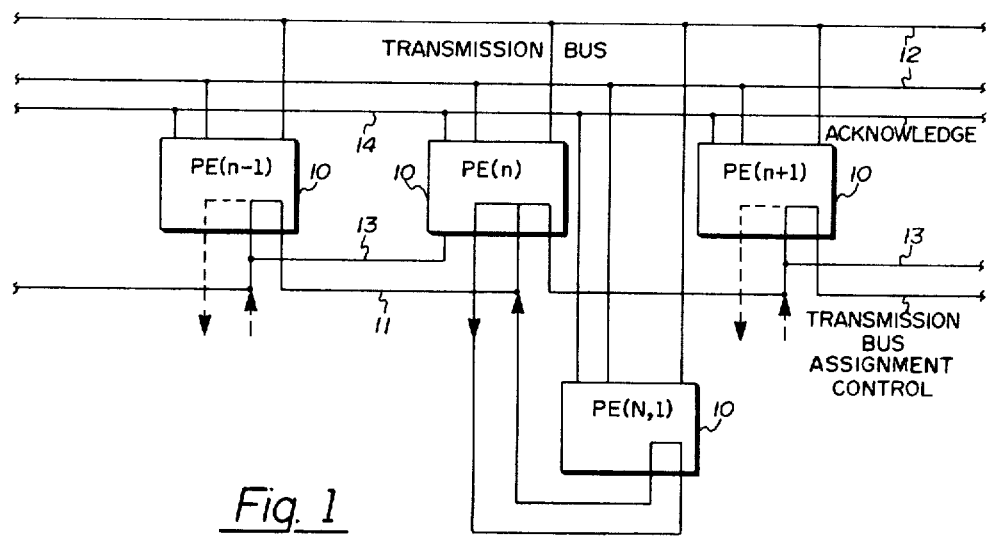
FIG. 1 is a diagram of a network employing the present invention.

The present invention is directed toward a method whereby a single line is used to determine which processing element is to be assigned to the data transmission bus. FIG. 1 is a block diagram of a system where several processing elements 10 are shown. Transmission bus assignment control line 11 is daisy-chained to all the processing elements. This line is a closed loop; thus, after a period of time, the assignment signal will return to the originating station. Data transmission bus 12 will be given an equal chance to service all processing elements.

When a processing element wants to transmit information over bus 12, it will make a request to a transmission bus request control to be described below. Sometime after the request is made, the circulating assignment pulse will arrive at the processing element wanting access. At this time, that processing element will stop the circulating pulse and use transmission bus 12. The mere fact that the circulating pulse has arrived at the processing element indicates that transmission bus 12 is free and can be used. After the utilization of transmission bus 12, the pulse is restarted and again starts on its way through the circulating path. This process is continued until the pulse is stopped by another processing element. If the processing element does not want access at the time of the arrival of the pulse, it will delay it for a short period of time (probably less than one microsecond), during which time it can make a decision before it is passed on to the next processing element. In FIG. 1, there is a possibility that if Processing Element (n) becomes malfunctioning or is not turned on, the bus assignment feature also becomes nonfunctioning. One object of the present invention is to provide a means to overcome this situation. In FIG. 1, additional circuit line 13 is shown. The function of this circuit is to alert the next processing element of the arrival of the assignment pulse to the previous processing element, e.g., Processing Element (n) will be alerted when the assignment pulse arrives at Processing Element (n−1).

If, after a predetermined time duration such as one millisecond, the assignment pulse does not arrive at the "alerted" processing element, a malfunction detection circuitry is activated. Note that the time duration is required to be sufficient to insure the transmission of any messages that might be sent by Processing Element (n−1). Other means to detect the failure of the Processing Element (n−1) may be used, such as sensing whether or not any data is being sent on the data bus.

The present invention employs a system using multiple microcomputers or other processing elements 10 which are connected to common bus 12 for data transmission. The assignment of the bus to a specific processing element is performed by circulating an assignment pulse which stops at the processing element that is ready to transmit data. Subsequently, data is transmitted and the assignment pulse is restarted and continues its circulation, seeking the next processing element that is ready to transmit.

Once bus 12 is assigned, data is transmitted over it. The receiving processing element determines the status of the message and acknowledges accordingly. This acknowledgment is transmitted over a common acknowledgment bus 14 to all processing elements. However, because of a window established by each processing element, only the processing element that did the transmission will be in a condition to accept this acknowledgment. During the acknowledgment, data bus 12 will be transmitting data from another processing element to either the same receiving element or another receiving element. Retransmission, if necessary, will be performed during the next data bus use opportunity. Although not necessary to the design as herein described, the data bus transmits byte-serially while the acknowledge signal is bit-serially. Thus, the transmitted message must be of a minimum length or the acknowledgment signals will fall behind, thus causing problems.

Figure 2:
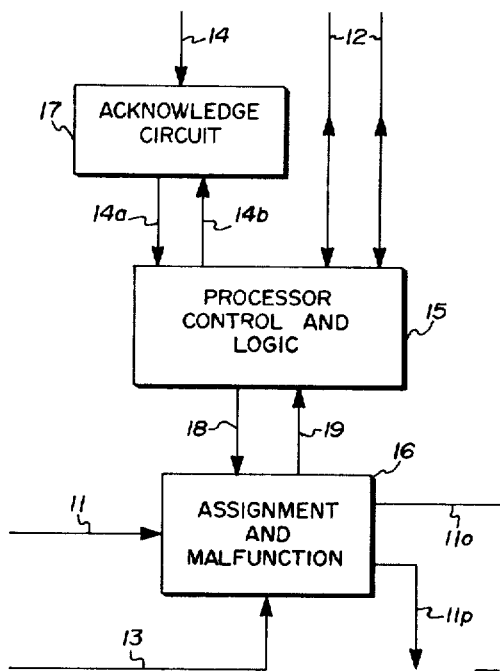
FIG. 2 is a schematic diagram of a station employing the present invention.

A more detailed description of one of the processing elements 10 of FIG. 1 is illustrated in FIG. 2. In addition to the standard processor and control logic 15, the processing element includes assignment and malfunction circuitry 16 and acknowledge circuitry 17. Processor control and logic 15 is coupled to data transmission bus 12 and receives an acknowledgment signal from common acknowledgment line 14 as was described above. Assignment and malfunction circuitry 16 receives the circulating assignment pulse from the preceding processing element by way of input line 11 and, if no transmission is required, transmits that signal on to the next processing element by way of output line 11a. If the processing element is also coupled to another element having a lower priority, it sends an output signal at the appropriate time by way of output line 11p as was described above.

If processor and control logic 15 requires transmission, it sends a request signal to assignment and malfunction circuitry 16 by way of request line 18. When assignment is granted as was described above, processor and control logic 15 is notified by way of assignment granted line 19. In addition, assignment and malfunction circuitry 16 receives a malfunction alert signal by way of alert line 13 as was described above.

DETAILED DESCRIPTION OF THE INVENTION

Figure 3:
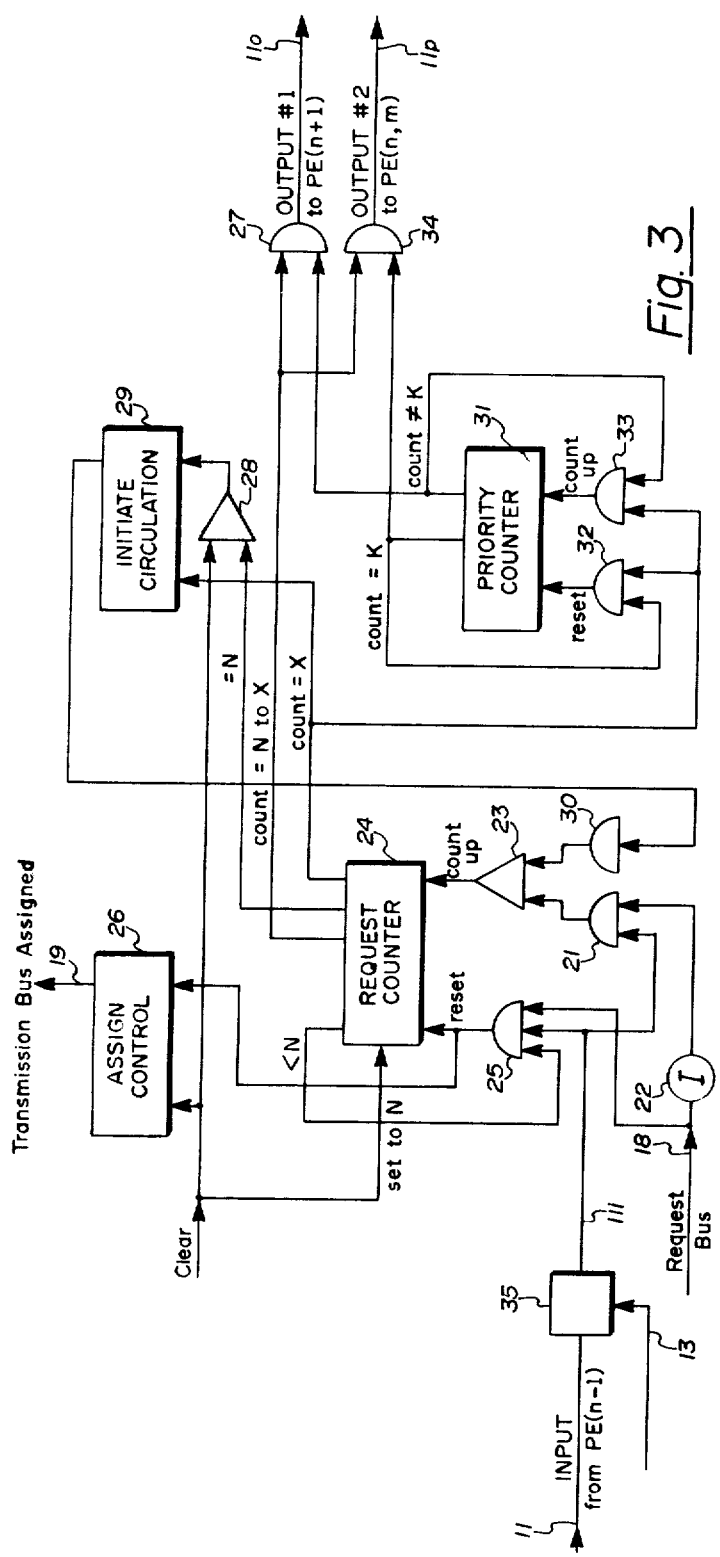
FIG. 3 is a schematic diagram showing the bus request control circuitry for each device in the network of the present invention.

FIG. 3 shows a possible method of implementing the logic for assignment of the transmission bus. As the input pulse arrives, it is supplied into a request counter. The counter will start to count at the processing element clock rate. If the processing element should make a request before the count is equal to N, the transmission bus will be assigned to it. However, if a request is not received before then, the counter will produce an output pulse to the Output No. 1 line which is connected to the next processing element. After the counter has reached a count of X, it will be reset and thus end the cycle.

However, if the processing element should make request within the allotted time, Assign Control will be turned on and the transmission bus assigned to the processing element. Request Counter circuit 24 will be reset to zero. After the use of the transmission bus, Initiate Circulation Control circuit 29 will cause the issuance of the request pulse to be propagated to Output No. 1 line.

As illustrated in FIG. 3, the bus assignment signal is received from the previous processing element and supplied by way of AND gate 21 and OR gate 23 to initiate Request Counter 24. AND gate 21 will be in a conducting condition until an internal request signal is received by inverter 22. Request Counter 24 will continue to count until it reaches a count of N unless such an internal request signal is received by AND gate 25 during that time, in which case Assignment Control unit 26 is activated to indicate access to the transmission bus has been obtained. At this time, Request Counter 24 is reset. When Request Counter 24 reaches a count of N without an internal request signal having been received, it will continue to count but will initiate an Output Signal by way of either AND gate 27 or AND gate 34 in accordance with the output of Priority Counter 31 to be described below. When Request Counter 24 reaches a count of X, it will reset Initiate Circulation Circuit 29 which was activated when Request Counter 24 reached a count of N.

When the current processing element has been assigned access to the transmission bus, and that transmission has been completed, a clear signal is supplied to Assignment Control unit 26 and to activate Initiate Circulation Circuit 29; and also to set Request Counter 24 to N so it may proceed on its counting until it reaches a count of X so as to supply an Output Signal to the next processing element.

Priority Counter 31 serves to periodically allow other processing elements with a lower priority to have access to the transmission bus. Each time a request pulse passes through the higher priority circuit, Priority Counter 31 is incremented by one (1); and, as long as its count is less than K, any output from the next processing element will be by way of gate 27. Once Priority Counter 31 reaches a count of K, the next output signal will be by way of gate 34 and Priority Counter 31 will be reset.

Figure 4A:
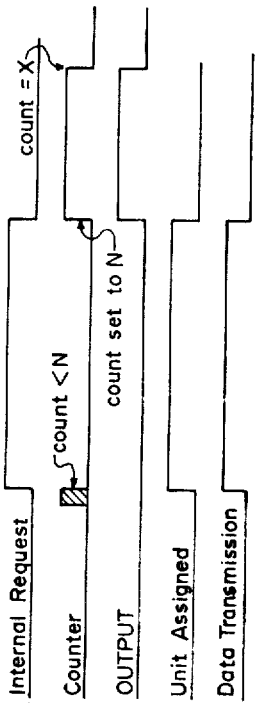
FIGS. 4A and 4B are timing charts showing the timing relation between the occurrence of an internal request for bus access and external inputs thereto.
Figure 4B:
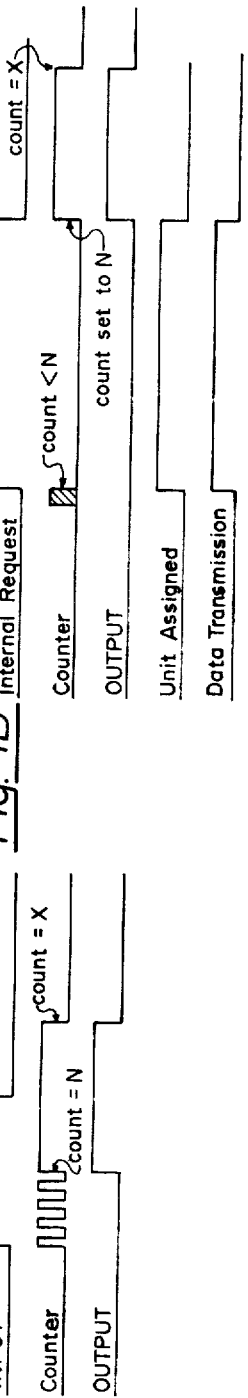

FIGS. 4A and 4B are timing charts showing the operation of the system. In FIG. 1 there is one processing element the priority of which is not as critical as the other processing elements. In this case, namely Processing Element (n,1), it will be sampled less frequently than Processing Element (n). The frequency of sampling will be determined by Priority Counter 31 of FIG. 3. Each time the request pulse passes through the higher priority circuit, the priority counter will be incremented by one (1). At some predetermined point, e.g., the count of K, the request pulse will be sidetracked in Output No. 2 line. At this time, Processing Element (n,1) will be sampled to determine if access to the transmission bus is desired. By the use of this type of assignment, any number of system configurations can be designed.

The circuitry of FIG. 3 has two inputs and two outputs. One of the inputs is from the preceding unit and the other input is from the current unit. The input from the preceding unit is called Input and the input from the current unit is called Internal Request. It is to be noted that assignment can only be made when there is a request and an input signal. The input signal signifies that the bus is free.

Malfunction detection circuit 35 of FIG. 3 is illustrated in detail in FIG. 5. FIG. 5 shows the logic circuitry employed to determine whether or not the time duration has passed for detecting a malfunction. The malfunction count control is set by the assignment pulse arriving at Processing Element (n−1). The malfunction counter will then start to count when the alert timing pulse arrives at Processing Element (n). If an assignment pulse arrives before the malfunction counter equals L, both the malfunction counter and the malfunction count control will be reset and thus end the checking cycle. However, if the assignment pulse does not arrive until the counter equals L, malfunction detection circuitry is activated (or another form of alarm indicated). At this point it is known that Processing Element (n−1) received the assignment pulse but failed to act upon it, thus indicating a malfunction.

The assignment pulse may be stopped at this point until the corrective measure is taken. On the other hand, the malfunction detection circuitry may be set and the assignment pulse reinitiated so that the system will continue to function.

In FIG. 1, no alert pulse circuit line 13 has been indicated going from processing element PE(n) to succeeding elements PE(n+1) and PE(n,1) as element PE(n) will have to select one or the other according to the frequency with which element PE(n,1) is to be serviced. This can be done by circuitry (not shown) which is similar to Priority Counter 31 and output gates 27 and 34 of FIG. 3.

As illustrated in FIG. 5, the alert pulse received from the previous element will initiate Malfunction Count Control 41 and enable Malfunction Counter 43 to begin counting. The receipt of an input assignment pulse from the previous processor will serve to reset both Malfunction Count Control 41 and Malfunction Counter 43. However, if Malfunction Counter 43 reaches a count of L before it is reset, it will then initiate a new output assignment pulse to be supplied to the next processing element, until Malfunction Counter 43 reaches a count of S at which time both Malfunction Count Control 41 and Malfunction Counter 43 will be reset. If a normal assignment pulse is received from the previous processing element and no request has been made by the current processing element, that pulse will also be supplied by way of OR gate 44 to initiate a new output pulse to the next processing element.

FIGS. 6A and 6B are the timing diagrams illustrating the operation of the malfunction detection circuitry.

The acknowledgment circuitry 17 of FIG. 2 is illustrated in detail in FIG. 7. In FIG. 7, once the processing element having access to the transmission bus has finished its transmission, an end of message signal will activate Acknowledgment Counter Control 50 to enable Acknowledgment Counter 51. Counter 51 will then proceed to count to Y to establish the acknowledgment window by supplying a continuous signal to AND gate 52 to condition it to receive the actual acknowledgment signal from the receiving processing element. When Acknowledgment Counter 51 reaches a count of Y, it resets both Acknowledgment Counter 51 and Acknowledgment Counter Control 50.

FIG. 8 shows the timing signals of two processing elements using the data bus in consecutive order. Note the acknowledgment of the Processing Element (n) is being overlapped with the data transmission of Processing Element (n+1). In this case, the acknowledge signal time is t1 and the window during which the acknowledgment is acceptable is t2 (t2 must be greater than t1 or the system will not function).

EPILOGUE

A network of stations has been disclosed having a single transmission bus. A bus assignment control line is daisy-chained to all of the stations to form a closed loop such that an assignment signal will circulate through the loop and return to the originating station after each station has been given an equal chance to be serviced. Each station is provided with means to detect when the preceding station is malfunctioning or is not turned on, and in response thereto, to transmit a bus assignment control signal to the next succeeding station if it itself does not require access to the transmission bus.

While but one embodiment of the present invention has been disclosed, it will be apparent to those skilled in the art that variations and modifications can be made therein without departing from the spirit and scope of the invention as claimed.

What is claimed is:

1. A network of stations for data transmissions therebetween, said network comprising:
   a single transmission bus;
   a plurality of stations coupled to said bus;
   a bus assignment control line coupled to each of said stations in a serial manner to transmit a bus assignment control pulse;
   a plurality of preceding station non-operating alert lines, each coupled between a preceding station and a succeeding station to alert said a succeeding station that said a preceding station has received said bus assignment control pulse;
   each of said stations including detection means to detect when its preceding station has received but not transmitted a bus assignment control pulse after a time duration sufficient to allow said preceding station to have been assigned to said transmission bus and to have completed its transmission;
   a request counter means disposed for counting to a second given count in response to a signal requesting access to said transmission bus and, if said each station does not request access to said bus, to signal said pulse receiving and transmitting means to transmit said bus assignment control pulse to said next succeeding station; and
   initiate circuit means disposed for initiating an assignment control pulse to be transmitted to another station after each said station has completed transmission, said request counter means resets said initiate circuit means when a particular count is reached which is greater than said second given count.

2. A network according to claim 1 wherein said detection means further includes:
   a detection counter coupled to said bus assignment control line and being disposed for counting to a given count during which time duration said preceding station should receive said bus assignment control pulse; and
   a bus assignment control pulse generation means coupled to said detection counter and being disposed for generating a new bus assignment control pulse if the control pulse from the preceding station was not received during said count.

3. A network according to claim 1 wherein each station further includes:
   bus assignment control pulse receiving and transmitting means to receive either of said preceding or generated bus assignment control pulses and, if said each station does not require access to the transmission bus, to retransmit that pulse to the next succeeding station.

4. In a network of stations for data transmissions therebetween, said network having a single transmission bus, a station comprising:
   a bus assignment control line coupled to said station from a preceding station and to a succeeding station to transmit a bus assignment control pulse;
   a preceding station non-operating alert line, coupled between said preceding station and said a station to alert said a station that said preceding station has received said bus assignment control pulse;
   a detection counter coupled to said bus assignment control line and being disposed for counting to a given count during which time duration said preceding station should receive said bus assignment control pulse; and
   a bus assignment control pulse generation means coupled to said detection counter and being disposed for generating a new bus assignment control pulse if the control pulse from the preceding station was not received during said count.

5. A station according to claim 4 further including:
   bus assignment control pulse receiving and transmitting means to receive either of said preceding or generated bus assignment control pulses and, if said each station does not require access to the transmission bus, to retransmit that pulse to the next succeeding station.

6. A station according to claim 5 further including:
a request control line coupled to said detection counter and being disposed for requesting access to said transmission bus; and
a request counter means coupled to said request control line and being disposed for counting to a second given count and, if said each station does not request access to said bus, to signal said pulse receiving and transmitting means to transmit said bus assignment control pulse to said next succeeding station.

7. A station according to claim 5 further including:
a request control line coupled to said detection counter and being disposed for requesting access to said transmission bus; and
a request counter means coupled to said request control line and being disposed for counting to a second given count and, if said each station requests access to said bus, to signal said each station that access has been granted.

8. In a station in a network of stations for data transmissions therebetween, said network having a single transmission bus coupled to each of said stations, a bus assignment control line coupled to each of said stations in a serial manner, and a plurality of alert pulse lines each coupled between a preceding station and a succeeding station, the method comprising:
receiving an alert pulse from a preceding station that said preceding station has received said bus assignment control pulse;
detecting when said preceding station has not transmitted a bus assignment control pulse after a time duration sufficient to allow said preceding station to have been assigned to said transmission bus and to have completed its transmission;
counting to a given count during which time duration said a station should receive said bus assignment control pulse; and
generating a new bus assignment control pulse if the control pulse from the preceding station was not received during said count.

9. A method according to claim 8 further comprising:
receiving either of said preceding or generated bus assignment control pulses and, if said a station does not require access to the transmission bus, transmitting the bus assignment control pulse to the next succeeding station.

* * * * *